US006612538B2

(12) United States Patent
Fukano et al.

(10) Patent No.: US 6,612,538 B2

(45) Date of Patent: Sep. 2, 2003

(54) TWO-WAY VALVE

(75) Inventors: Yoshihiro Fukano, Ibaraki-ken (JP); Tadashi Uchino, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 101 days.

(21) Appl. No.: 09/899,195

(22) Filed: Jul. 6, 2001

(65) Prior Publication Data

US 2002/0003222 A1 Jan. 10, 2002

(30) Foreign Application Priority Data

Jul. 7, 2000 (JP) ....................................... 2000-206977

(51) Int. Cl.[7] ..................... F16K 31/143; F16K 31/163; F16K 31/363; F16K 31/383

(52) U.S. Cl. ....................................... 251/63.5; 137/270

(58) Field of Search ........................... 251/62, 63, 63.5; 137/269, 270; 239/390, 391

(56) References Cited

U.S. PATENT DOCUMENTS 4,526,341 A * 7/1985 Thomas ..................... 251/63.5
4,687,017 A * 8/1987 Danko et al. .......... 137/315.01
4,712,576 A * 12/1987 Ariizumi et al. ............ 137/270
4,828,219 A * 5/1989 Ohmi et al. ................ 251/118
4,840,347 A 6/1989 Ariizumi
4,995,589 A * 2/1991 Adishian et al. ......... 251/335.3
5,253,671 A * 10/1993 Kolenc .................. 137/315.05
5,889,275 A * 3/1999 Chen .......................... 239/391
5,996,636 A 12/1999 Fukano et al.

FOREIGN PATENT DOCUMENTS

| | | |
|---|---|---|
| DE | 38 08 478 A1 | 9/1989 |
| EP | 0 844 401 A1 | 5/1998 |
| JP | 61-79084 | 4/1986 |
| JP | 62-82477 | 5/1987 |
| JP | 63-88387 | 4/1988 |

OTHER PUBLICATIONS

Co–pending U.S. patent application Ser. No. 09/899,196, filed Jul. 6, 2001, by Yoshihiro Fukano et al.

Co–pending U.S. patent application Ser. No. 09/899,202, filed Jul. 6, 2001, by Yoshihiro Fukano et al.

Note: U.S. Patent No. 4,840,347 corresponds in subject mater to DE 38 08 478 A1, and serves as a translation thereof.

Note: English language abstracts of the above Japanese citations are provided to serve as partial translations thereof.

* cited by examiner

*Primary Examiner*—Edward K. Look
*Assistant Examiner*—John K Fristoe, Jr.
(74) *Attorney, Agent, or Firm*—Paul A. Guss

(57) ABSTRACT

A two-way valve has a valve mechanism comprising a displacement mechanism for opening and closing a fluid passage by an action of a pilot pressure from a pilot port. The pilot port is formed on an annular member disposed between a body and a bonnet and is rotatable circumferentially by the annular member.

5 Claims, 5 Drawing Sheets

X1 X2 10 50 52 16 32 54b 54a 48 40 42 30 62a 44 92 80 88a 38 56 62b 86 76 18 74 74 14a 88b 84 86 36a 60 82 46 14 58 66 64 36b 72 22 70 24 20b 28 34 26 12b

X1
X2
10
50
16
32
52
54b
54a
48
40
42
62a
92
88a
56
86
30
44
80
38
62b
76
18
74
14a
88b
82
58
60
66
46
64
84
86
36a
14
36b
34
24
72
22
70
20b
28
26
12b

X1
X2
10
14a
76
78
14
12b
18
74
88a
86
38
30
80
88b
84
92
20b
54a
72
70
54b
22
16
50
46
52
24
48
32
68
62a
40
42
86
44
62b
64
82
58
74
26
28
20a
12a 14
28
90
36a
34
82
36
24
28

TWO-WAY VALVE

BACKGROUND OF THE INVENTION

1. Field of the Invention

The present invention relates to a two-way valve having a first port and a second port for introducing and discharging pressurized fluid in two directions.

2. Description of the Related Art

Two-way valves have conventionally been used, e.g., in a fluid circuit. The two-way valve has a first port and a second port for introducing and discharging pressurized fluid, and has a valve body for opening and closing a communication passage between first and second ports. The valve body is operated by a pilot pressure supplied through a pilot port.

In the conventional two-way valves, however, the pilot port is fixed in a predetermined position of the valve body. If an installation space is small, it is difficult to connect a tube to the pilot port in piping operations and also difficult to freely change the direction of a tube since the direction of the tube is limited. Accordingly, the usability is not satisfactory.

SUMMARY OF THE INVENTION

It is a general object of the present invention to provide a two-way valve wherein a position of a pilot port can be freely changed based on an installation environment. The two-way valve makes piping operations easy and allows pipes or tubes to be freely arranged for convenience.

DESCRIPTION OF THE PREFERRED EMBODIMENTS

An embodiment according to a two-way valve will be described with reference to accompanying drawings.

Figure 1:
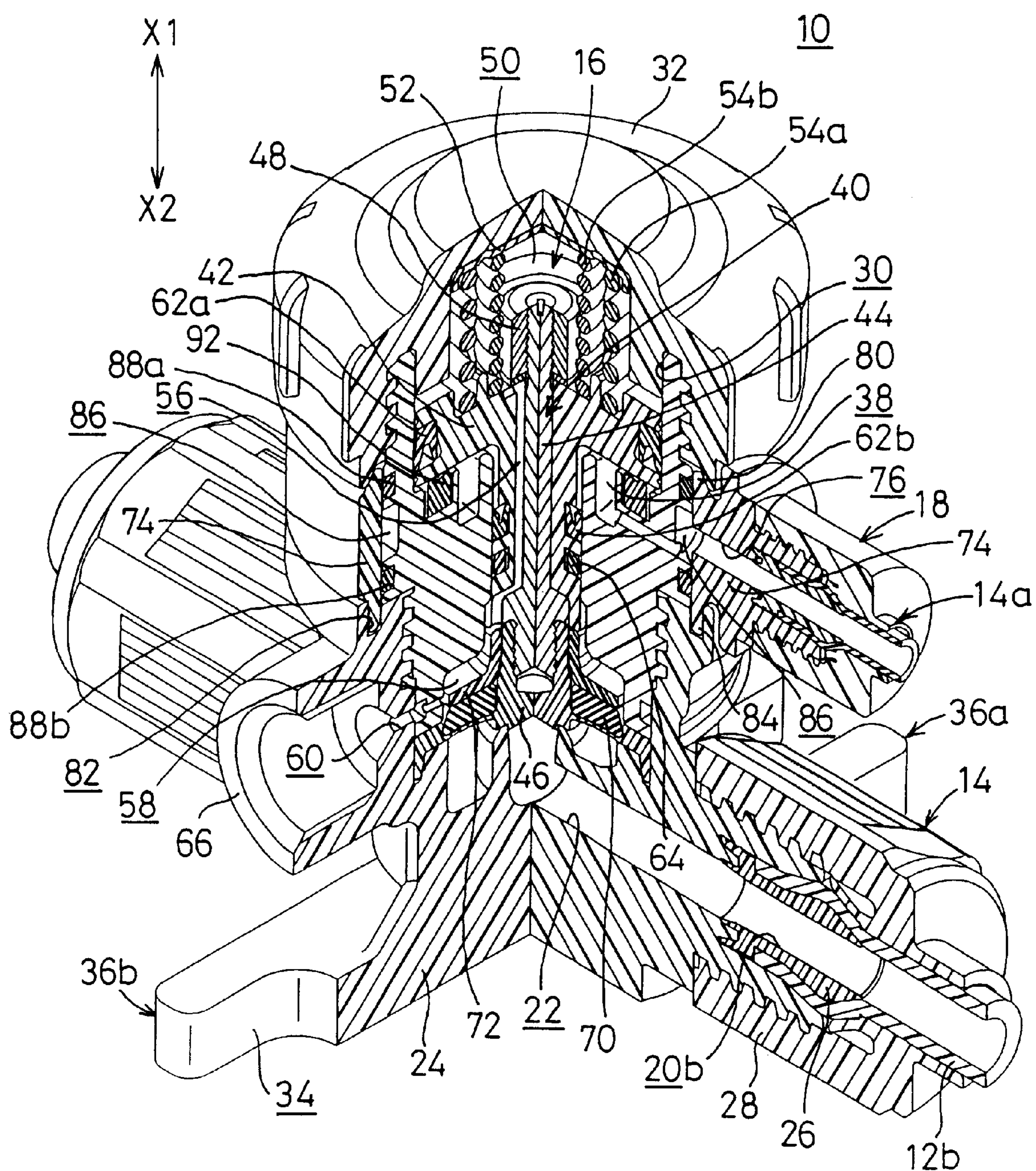
FIG. 1 shows a partially cut-away perspective view illustrating a two-way valve according to an embodiment of the present invention.
Figure 2:
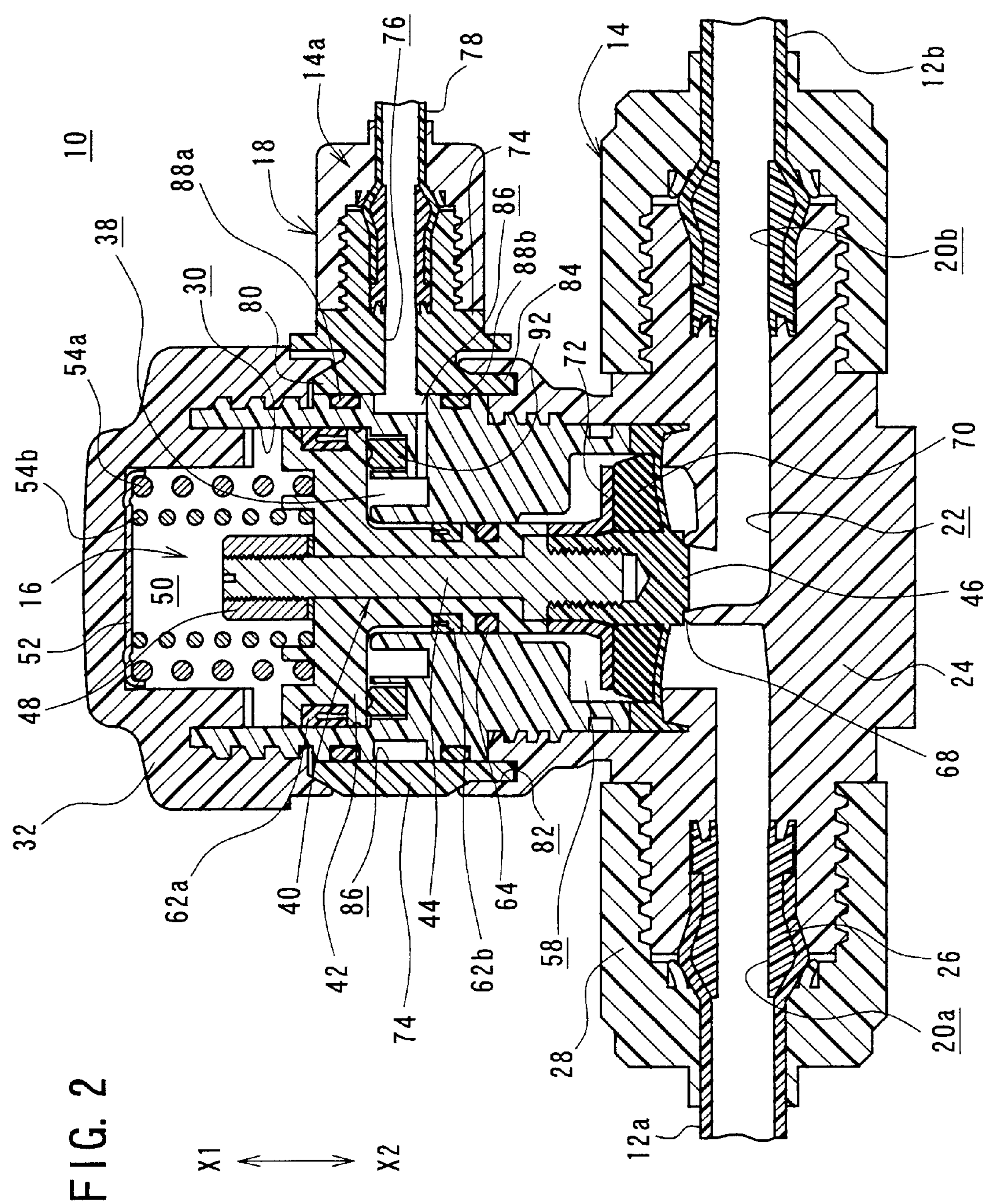
FIG. 2 shows a vertical sectional view of the two-way valve.
Figure 3:
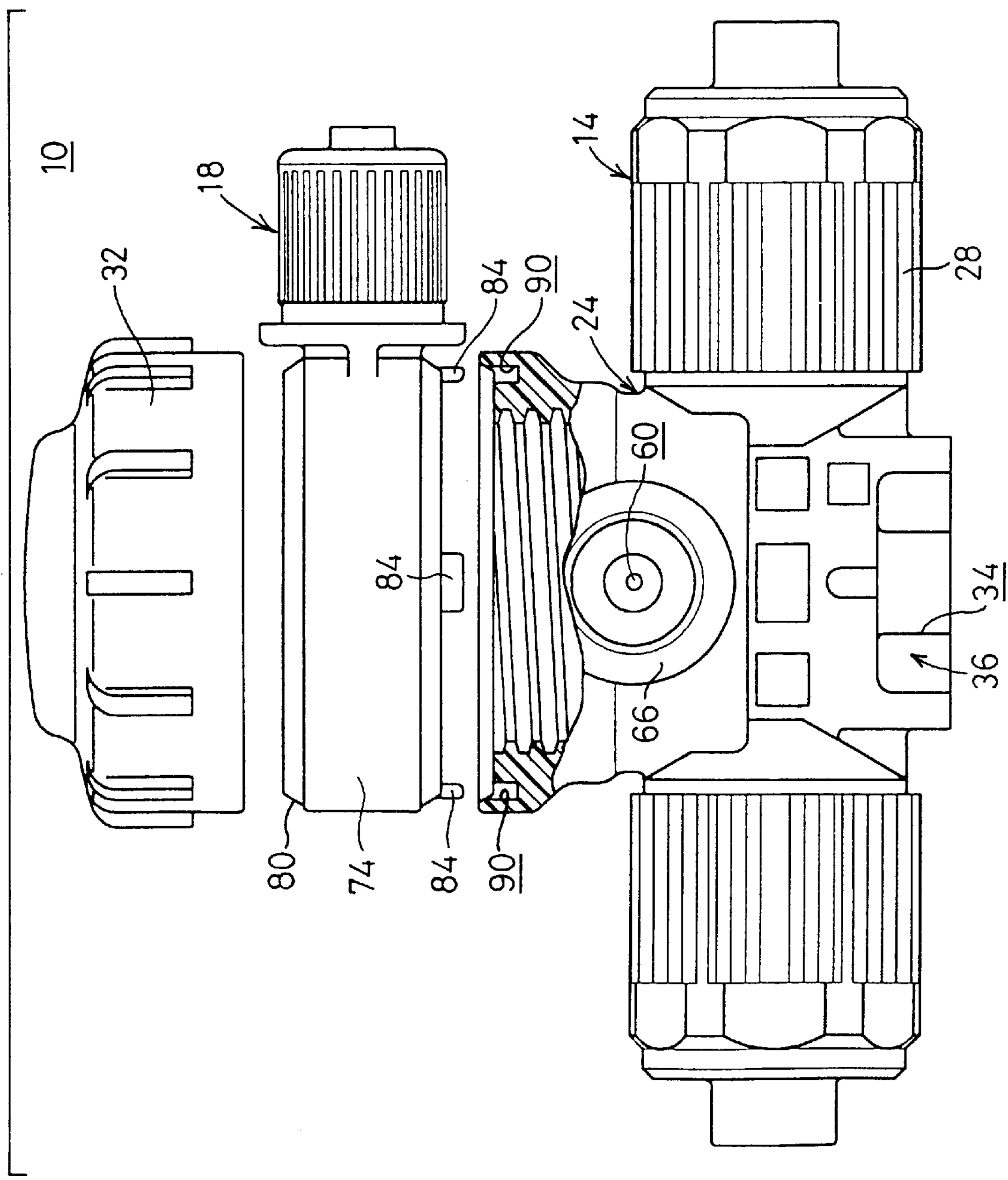
FIG. 3 shows a partially cut-away and exploded front view of the two-way valve.

In FIGS. 1 and 2, the reference numeral 10 denotes the two-way valve according to the embodiment of the present invention.

The two-way valve 10 basically comprises a joint section 14 detachably connected to a pair of tubes 12*a* and 12*b*, a valve mechanism 16 positioned over the joint section 14, and a pilot pressure supplying section 18 for supplying a pilot pressure to energize the valve mechanism 16.

The joint section 14, the valve mechanism 16, and the pilot pressure supplying section 18 are assembled into a single unit.

The joint section 14, as shown in FIG. 2, has a first port 20*a* and a second port 20*b* defined at its opposite ends, respectively. Further, the joint section 14 comprises a body 24, a pair of inner members 26, and a pair of lock nuts 28. The body 24 has a fluid passage 22 defined therein for communication between the first port 20*a* and the second port 20*b*. The inner members 26 engage with the body 24 in the first port 20*a* and the second port 20*b* and are inserted in openings of tubes 12*a* and 12*b*, respectively. The lock nuts 28 are screwed over threaded portions of the body 24 so as to ensure air-tightness or liquid-tightness at the connecting portions between the tubes 12*a* and 12*b* and the inner members 26.

Sealing is effected by engagement between the inner members 26 and other members. The inner members 26 have sealing surfaces substantially parallel to the axial line of the joint section 14. Inclined surfaces of the inner members 26 do not have sealing capability. The structure of the joint section 14 is discussed in detail in the U.S. Pat. No. 5,996,636 filed by the present applicant and the disclosures of which are herein incorporated by reference.

Figure 5:
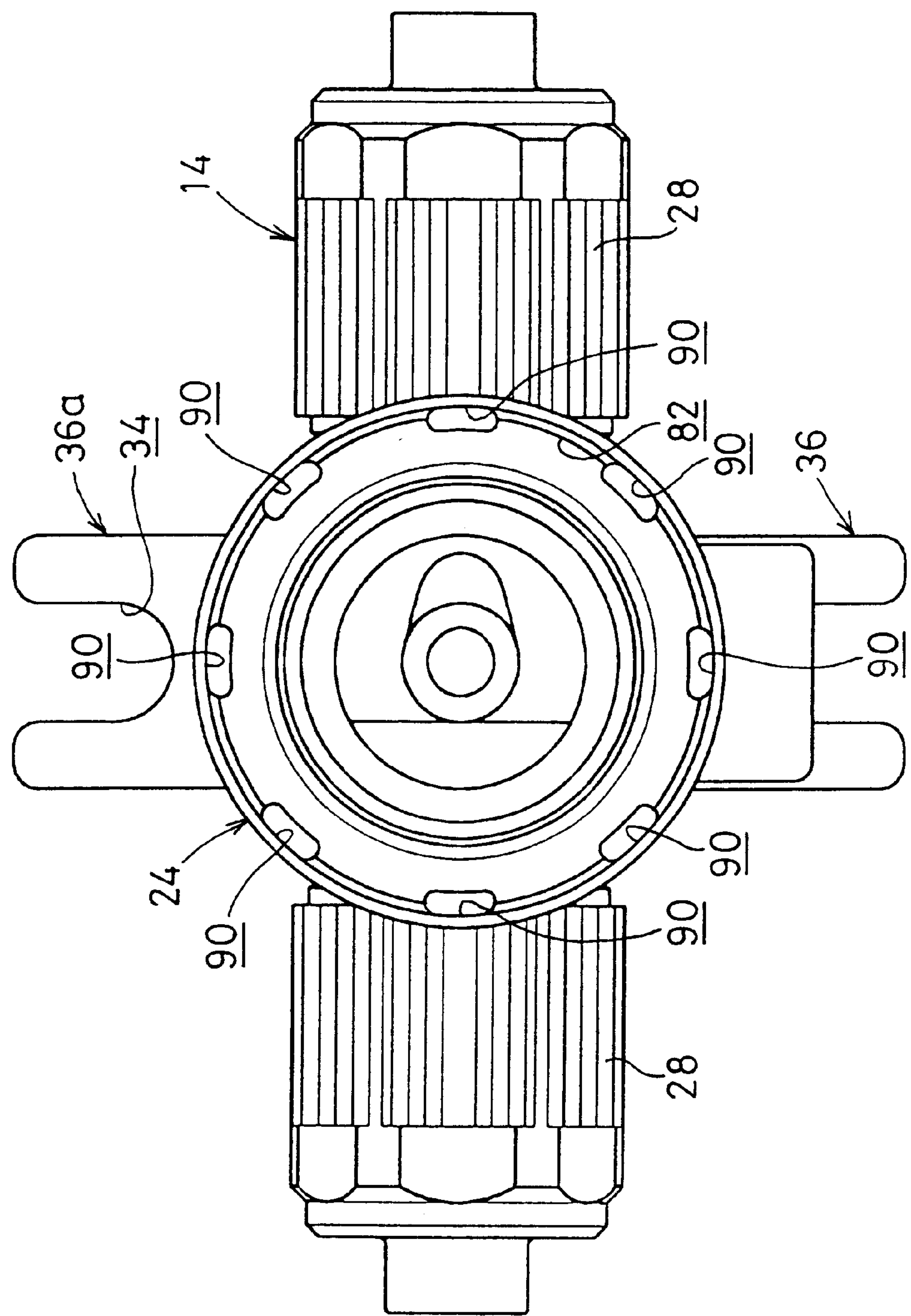
FIG. 5 shows a top plan view illustrating a body of the two-way valve.

A substantially circular opening 30 is defined on the upper part of the body 24. The opening 30 is closed by a bonnet 32. Further, a pair of fixing members 36*a* and 36*b* each having a U-shaped portion 34 are provided at the lower part of the body 24. The fixing members 36*a* and 36*b* are disposed oppositely with each other on a straight line perpendicular to an imaginary line (not shown) connecting the first port 20*a* and second port 20*b* (see FIG. 5).

The valve mechanism 16 comprises a displacement mechanism 40 which is displaced along a cylinder chamber 38 in the body 24 in the directions indicated by X1 and X2, for opening and closing the fluid passage 22.

The displacement mechanism 40 comprises a piston 42 having a T-shaped cross section, a rod 44 inserted in a through hole axially defined in the piston 42, a diaphragm 46, and a nut 48. The diaphragm 46 is connected to one end of the rod 44 and displaced in unison with the piston 42. The nut 48 is connected to the other end of the rod 44.

A chamber 50 is formed between the piston 42 and the bonnet 32. A pair of springs 54*a* and 54*b* having different diameters, i.e., an outer spring 54*a* and an inner spring 54*b* are disposed in the chamber 50. The lower ends of the springs 54*a* and 54*b* are connected to the upper surface of the piston 42 and the upper ends of the springs 54*a* and 54*b* are seated on a substantially circular spring seat 52. The displacement mechanism 40 including the diaphragm 46 is biased downwardly (in the X2 direction) by the resilient force of the spring 54*a* and 54*b*.

A communication passage 56 (see FIG. 1) running substantially parallel to the axis of the rod 44 is defined in the piston 42 for communication between the chamber 50 and a diaphragm chamber 58. Thus, air in the chamber 50 can be discharged to the outside from a fluid inlet/outlet port 60 as described later on.

The piston 42 comprises a large-diameter portion having an annular groove for attaching a V-packing 62*a* and a small-diameter portion having annular grooves for attaching a second V-packing 62*b* and an O-ring 64.

The diaphragm chamber 58 is formed under the piston 42, and covered by the diaphragm 46. The diaphragm chamber 58 communicates with the outside through the fluid inlet/outlet port 60. Therefore, since the chamber 50 communicates with the diaphragm chamber 58 through the communication passage 56, air in the chamber 50 and the diaphragm chamber 58 can be discharged to the outside from the fluid inlet/outlet port 60.

Further, as shown in FIG. 1, an annular fixing section 66 having the fluid inlet/outlet port 60 is connected to a tube or the like through a tube joint (not shown). In this manner, air in the chamber 50 and the diaphragm chamber 58 can be discharged to the outside desirably. That is, the two-way valve 10 according to the present embodiment can be used in a clean room where cleanness condition needs to be maintained since the two-way valve 10 does not pollute the air in the clean room.

The diaphragm 46 is coupled to a lower part of the piston 42 by connecting the diaphragm 46 and the rod 44. Therefore, the diaphragm 46 is displaced in unison with the piston 42 and functions as a valve plug. When the diaphragm 46 is spaced from a valve seat 68 to make a clearance between the diaphragm 46 and the valve seat 68, the fluid passage 22 is opened for allowing pressurized fluid (or non-pressurized fluid) to flow in the fluid passage 22. When the diaphragm 46 is seated on the valve seat 68, the fluid passage 22 is closed for interrupting the fluid flow in the fluid passage 22. Accordingly, the diaphragm 46 can smoothly switch the condition of the fluid passage 22 between flow and interruption of the fluid.

A ring-shaped protection member 70 made of a resilient material such as rubber is provided on the upper surface of the diaphragm 46 for protecting a thin-walled portion of the diaphragm 46. The protection member 70 is supported by a bent support member 72 fixed to a lower part of the rod 44.

An annular member 74 is disposed between the body 24 and the bonnet 32. The annular member 74 is rotatable circumferentially about the axis of the rod 44. The annular member 74 has a pilot port 76 which communicates with the cylinder chamber 38. Therefore, the pilot port 76 can be set at an arbitrary position (angle) around the axis of the rod 44. The pilot port 76 is connected to a tube 78 through a joint section 14*a*. The joint section 14*a* has the same structure with a part of the joint section 14, though it has slightly smaller dimensions.

Figure 4:
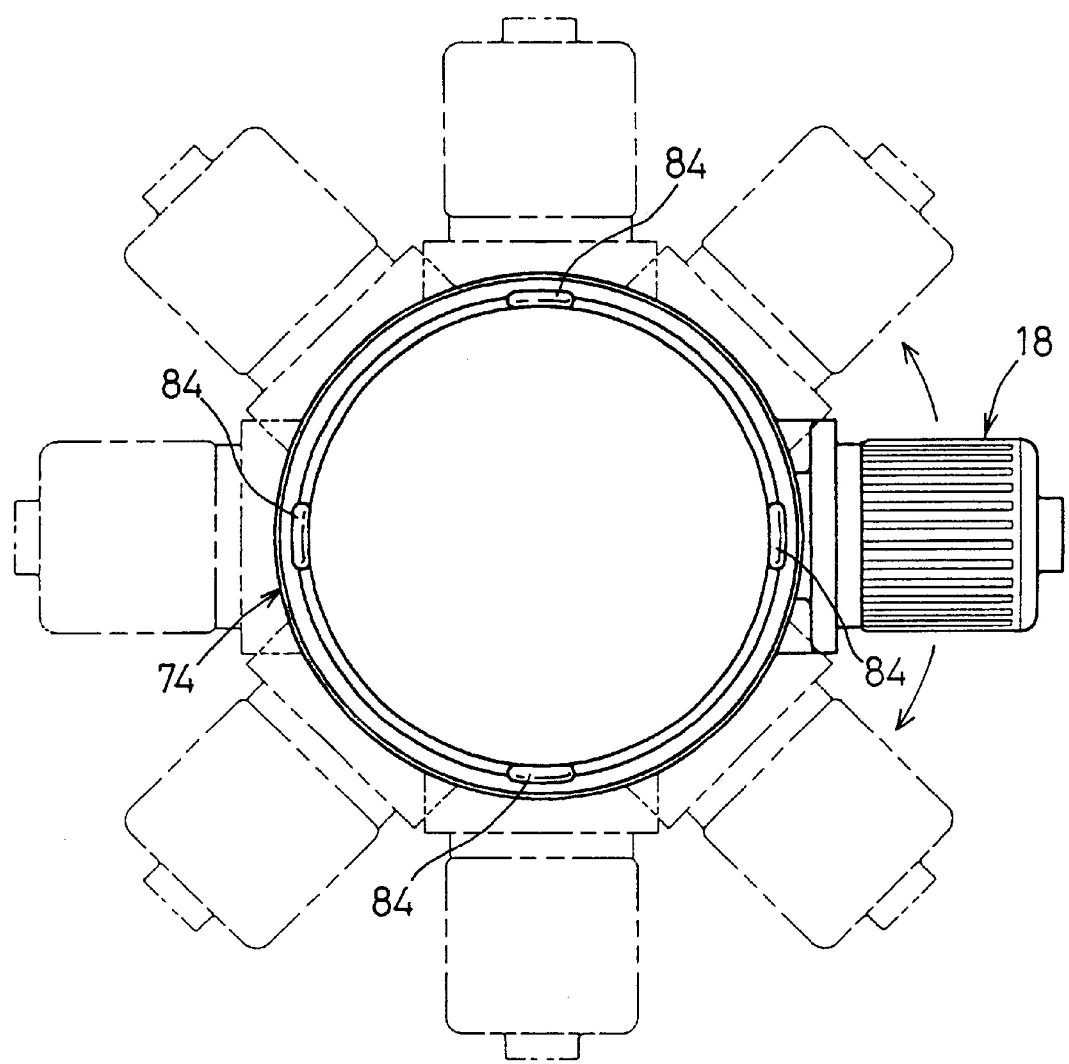
FIG. 4 shows a bottom plan view illustrating an annular member of the two-way valve.

On the upper annular edge of the annular member 74, an annular projection 80 is formed. The annular projection 80 engages with a lower edge of the bonnet 32. On the lower annular edge of the annular member 74, a plurality of protrusions 84 are formed. The protrusions 84 engage with an annular guide groove 82 defined in the outer circumferential surface of the body 24. In this case, four protrusions 84 are arranged circumferentially apart from each other at angles of about 90 degrees (see FIG. 4) about the center of the annular member 74. An annular passage 86 in communication with the pilot port 76 is formed circumferentially between the annular member 74 and the body 24. The annular passage 86 is sealed air-tight by a pair of O-rings 88*a* and 88*b* attached on an annular groove of the body 24 and spacing at a predetermined distance from each other.

The body 24 has eight recesses 90 arranged circumferentially apart from each other at angles of about 45 degrees about the axis of the piston 42. The respective protrusions 84 of the annular member 74 engage with the recesses 90 for fixing the annular member 74 in predetermined positions. The numbers of protrusions 84 of the annular member 74 and recesses 90 are not limited to four and eight, respectively. A protrusion 84 and a recess 90 or a plurality of those elements may be formed instead.

A ring-shaped shock absorbing member 92 is fitted in an annual groove of the body 24. The shock absorbing member 92 abuts against the large diameter portion of the piston 42 for absorbing shocks generated when the piston 42 is displaced downwardly.

In the present embodiment, the rod 44, the nut 48, the spring seat 52, and the springs 54*a* and 54*b* are made of a metal material such as stainless steal. All the other components are made of resin. It is desirable to coat the surfaces of the springs 54*a* and 54*b* by a certain material such as Teflon (trademark).

The two-way valve 10 according to the embodiment of the present invention is basically constructed as described above. Next, its operation, function, and effect will be explained.

The first port 20*a* of the two-way valve 10 is connected to an unillustrated fluid supply source, and the second port 20*b* is connected to an unillustrated fluid device, for example, through the tubes 12*a* and 12*b* connected to the first port 20*a* and the second port 20*b*, respectively. The pilot port 76 is connected to an unillustrated pressurized air supply source through an unillustrated directional control valve.

After the above preparation, when the diaphragm 46 is seated on the valve seat 68, which is described as OFF (closed) state, the pressurized air supply source is energized for supplying a pilot pressure with the pilot port 76 by a switching action of the directional control valve. The pilot pressure introduced from the pilot port 76 is supplied to the cylinder chamber 38. The piston 42 is displaced upwardly under an action of the pilot pressure against the resilient force of the springs 54*a* and 54*b*.

All the displacement mechanism 40 integrally including the piston 42 and the diaphragm 46 moves upwardly, then the diaphragm 46 is disposed apart at a predetermined distance from the valve seat 68, which is described as ON (opened) state. As a result, the fluid from the fluid supply source through the first port 20*a* flows into the fluid passage 22, and is supplied to the fluid device through the second port 20*b*.

Next, the pilot pressure to the pilot port 76 is interrupted by a switching action of the directional control valve. The pressure in the cylinder chamber 38 is decreased, so that the piston 42 is displaced downwardly by the resilient force of the springs 54*a* and 54*b* and the diaphragm 46 is seated on the valve seat 68 (OFF state).

The large-diameter portion of the piston 42 abuts against the shock absorbing member 92 of a ring shape for absorbing shocks generated when the piston 42 is displaced downwardly. Therefore, the vibration generated when the diaphragm 46 is seated on the valve seat 68 can be suppressed.

Further, according to the present embodiment, the annular member 74 is rotated about the axis of the rod 44. Therefore, it is possible to change the position of the pilot port 76 circumferentially. Thus, the direction of the pilot port 76 can be changed desirably by rotating the annular member 74. Since the position of the pilot port 76 can be changed depending on the place for installing the two-way valve 10, piping operations can be performed easily and directions of pipes can be changed freely. Accordingly, the usability of the two-way valve 10 is greatly improved.

Further, according to the present embodiment, the annular member 74 can be disposed at predetermined positions by engagement between the plurality of protrusions 84 of the annular member 74 and the recesses 90 of the annular guide groove 82 in the body 24. Therefore, the pilot port 76 can be engaged and disposed at predetermined positions for changing the direction of the pipe.

Furthermore, according to the present embodiment, the rod 44, the nut 44, the spring seat 52, the springs 54*a* and 54*b* are made of a metal material such as stainless steel, while all the other components are made of a resin material. Accordingly, even if a certain chemical is used as fluid, the chemical will be prevented from being reformed since the chemical will not contact with any metal materials.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A two-way valve comprising:

a joint section having a body with a first port at one end, a second port at the other end, and a fluid passage defined therein for communication between said first port and said second port;

a bonnet closing an opening of said body;

a valve mechanism having a displacement mechanism including a valve plug for opening and closing said fluid passage under an action of a pilot pressure; and a pilot pressure supplying section having a pilot port to be supplied with the pilot pressure, wherein said pilot port is formed on an annular member disposed between said body and said bonnet, said pilot port being formed integrally with said annular member and rotatable circumferentially integrally with said annular member, and wherein a plurality of protrusions are formed on an edge portion of said annular member, said protrusions being separated from each other by a predetermined angle in a circumferential direction, and a plurality of recesses are formed in an end surface of said body, said recesses being separated from each other by said predetermined angle in the circumferential direction, such that said pilot port is held in a state in which it is positionable a each pilot at each predetermined locations separated by said predetermined angle in the circumferential direction by rotating said annular member in said circumferential direction and engaging said protrusions in said recesses.

2. The two-way valve according to claim 1, wherein said displacement mechanism includes a piston displacing along a cylinder chamber in said body, a rod inserted in a through hole axially defined in said piston, a pair of springs for biasing said piston in a direction where said valve body is seated on a valve seat, and wherein said valve body is connected to one end of said rod and is displaced in unison with said piston.

3. The two-way valve according to claim 2, wherein a communication passage running substantially parallel to an axis of said rod is defined in said piston for discharging air in a chamber closed by said piston and said bonnet to outside.

4. The two-way valve according to claim 2, wherein an annular passage is formed circumferentially between said annular member and said body for communication between said pilot port and said cylinder chamber.

5. The two-way valve according to claim 4, wherein said annular passage is sealed by a pair of seal members attached on an annular groove of said body and spacing at a predetermined distance from each other.

* * * * *